March 17, 1959
J. R. IRELAND
2,877,929
SLURRY FEEDER
Filed June 6, 1956
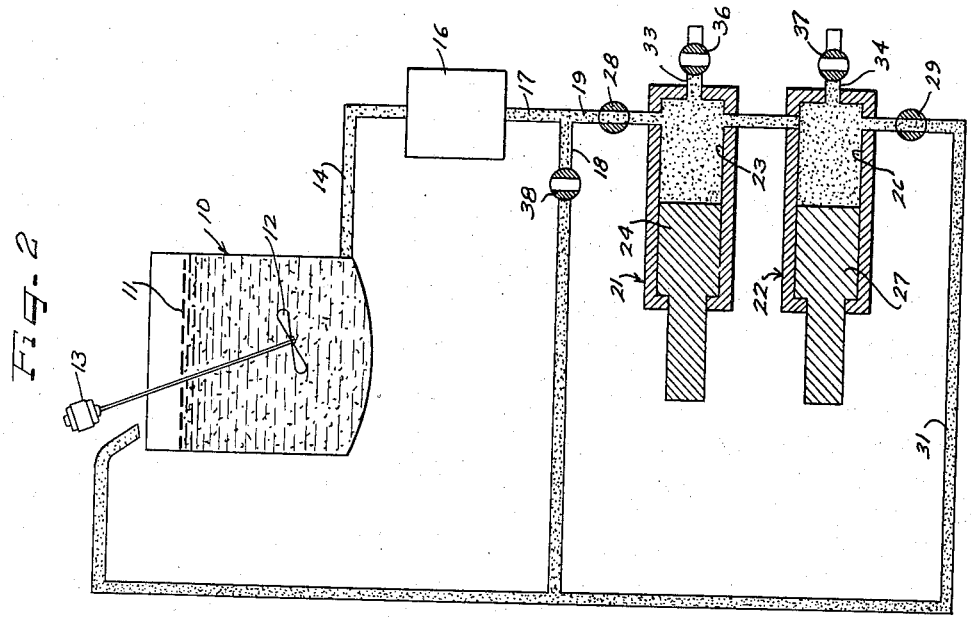
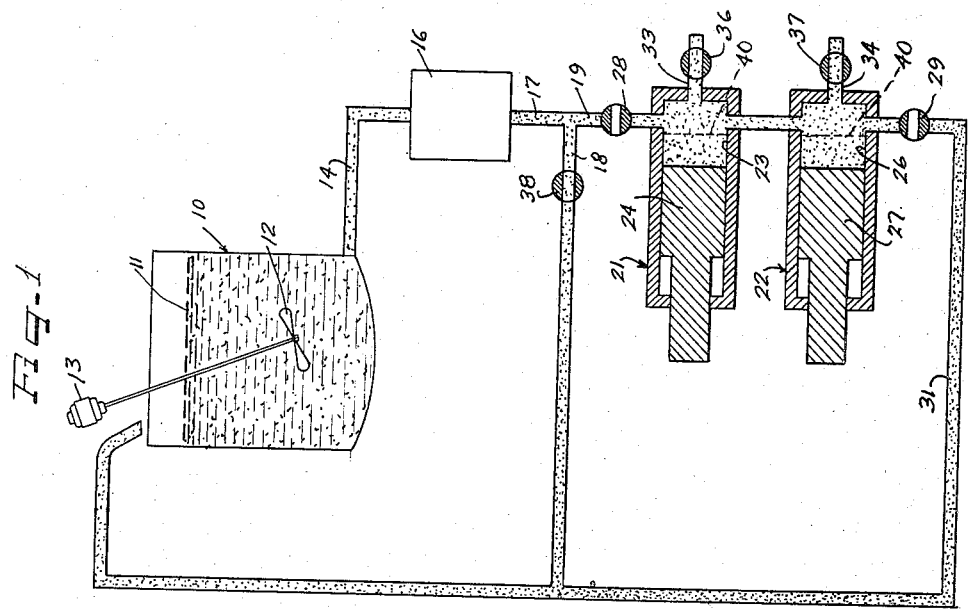
Inventor
JAMES R. IRELAND
by
Attys.

2,877,929
Patented Mar. 17, 1959

2,877,929

SLURRY FEEDER

James R. Ireland, Valparaiso, Ind., assignor to The Indiana Steel Products Company, Valparaiso, Ind., a corporation of Indiana Application June 6, 1956, Serial No. 589,606

6 Claims. (Cl. 222—1)

The present invention relates to an apparatus and method for handling slurries of the type which tend to settle out on standing, even when the standing time is relatively short.

The present invention is applicable generally to the handling of slurries of any composition provided that the slurry is sufficiently liquid to flow through orifices and through piping. The present invention is particularly applicable to the handling of alkaline earth compounds in admixture with iron oxides suspended in water. Such slurries are employed in the manufacture of pressed magnets of the ceramic type. Heretofore, considerable difficulty has been encountered in providing a feeding system to introduce such slurries into molding dies in exactly the quantities required because of the tendency of the solid material in the slurry to settle out in piping and in storage containers.

An object of the present invention is to provide an improved slurry handling system arranged to deliver predetermined, controlled amounts of the slurry to a container such as a shaping die.

Another object of the invention is to provide an improved slurry handling system in which the slurry is kept in a state of constant agitation even though the molding dies are to be filled only periodically.

Another object of the invention is to provide an improved method for handling slurries in a die filling process which minimizes or completely eliminates the settling problem.

A further description of the present invention will be made in conjunction with the attached sheet of drawings in which:

Figure 1 is a schematic view of a slurry handling system according to the present invention illustrating the position of the elements near the completion of the discharge cycle; and Figure 2 is a view similar to Figure 1 but illustrating the condition at the end of the filling cycle.

As shown in the drawings:

In Figure 1, reference numeral 10 indicates generally a container or reservoir for storing the bulk of the slurry in the system. A body 11 of the slurry is kept in a constant state of agitation by means of an agitator 12 driven by a suitable motor 13.

The container 10 has an outlet line 14 which continuously feeds slurry by gravity from the container 10 to a continuously operating slurry pump 16 of any suitable design. The discharge of the pump 16 is directed into a conduit 17 from which it is selectively directed either into a bypass line 18 or a feed line 19 associated with a feeding mechanism for filling the containers or molding dies with the slurry.

The particular feeding mechanisms illustrated in the drawings are of the positive displacement type and include one or more piston type feeders 21 and 22. As illustrated, the feeder 21 includes a cylinder 23 providing a pumping chamber and a reciprocating piston 24 having a stroke dependent upon the exact amount of slurry which is to be delivered to the container or molding die to be filled. Similarly, the feeder 22 includes a cylinder 26 providing a pumping chamber and a piston 27 for the same purpose. Obviously, the movement of the pistons 24 and 27 can be tied together mechanically if so desired.

The inlet to the feed mechanisms is controlled by the operation of a valve 28 in the inlet to the feed mechanisms, and an outlet valve 29 at the discharge end of the feed mechanisms. The valve 29 is located in an overflow line 31 which directs overflow from the feeding operation back into the container 10 as will be more apparent from a succeeding portion of this description.

The slurries are discharged under pressure by the operation of the pistons 24 and 27 to the respective outlet lines 33 and 34, the flow through the outlet lines being governed by the operation of a pair of valves 36 and 37 as illustrated.

A valve 38 is located in the bypass line 18 to permit continuous circulation of the slurry, even when the feed mechanisms are discharging, so as to avoid the possibility of settling in the lines while the feed mechanisms are discharging.

It is important for the purposes of this invention that the system be kept full of slurry at all times to avoid the possibility of air entrainment in the slurry.

As illustrated in Figure 1, during the discharge cycle of the apparatus, the valve 38 is open, permitting circulation of the slurry from the continuously operating pump 16 back into the container 10. During this cycle, the valves 28 and 29 are closed and the pistons 24 and 27 of the feed mechanisms force the slurry contained in the cylinders 23 and 26 under pressure through their respective discharge outlets 33 and 34, the valves 36 and 37 being open to permit this discharge. The dashed lines 40 in Figure 1 represent the inward limit of travel of the pistons 24 and 27 in their respective cylinders. At the completion of the discharge cycle the valves 36 and 37 are closed, the valves 28 and 29 are open, and the valve 38 is closed, as illustrated in Figure 2. The continuously operating pump 16 thereupon supplies the slurry under pressure to the line 19 and into the cylinders 23 and 26. During the filling cycle, of course, the pistons 24 and 27 are moved to the left, as viewed in Figures 1 and 2, under the pressure of the slurry from the operating pump 16 until the cylinders 23 and 26 are filled to the required amount. The slurry is thereby injected into the feed mechanisms without the accumulation of any air therein, since the slurry is being introduced under pressure at all times and the cylinders are full of slurry at all times. When the cylinders 23 and 26 are filled to the required extent, the slurry overflows through the line 31, since the valve 29 is open, and the overflow is recirculated back into the container 10. In this way, the slurry is kept in continuous motion until such time as the next discharge cycle is to occur. At that time the valves 28 and 29 are closed, and the valves 36, 37 and 38 are opened, starting another discharge cycle.

While the system has been shown in a somewhat simplified form, it will be recognized that the valves and pistons can be operated hydraulically, pneumatically, or by any suitable mechanical means in the desired sequence.

A system of the type described has been used successfully in the feeding of rapidly settable slurries. The system is very economical to operate and has a low initial cost and upkeep. Since the entire feed side of the system is at all times filled with slurry up to its operating volume capacity, there is no chance for air to get into the feed side of the system.

It will be understood that modifications and variations may be effected without departing from the scope of the novel concepts of the present invention.

I claim as my invention:

1. A slurry feeding system comprising a storage means for receiving a slurry, a pump receiving slurry from said storage means, a feeding means having a pumping chamber, a bypass means upstream of said pumping chamber and discharging into said storage means, valve means arranged to direct selectively the discharge of said pump into and through said feeding means or into said bypass means, and means directing material passing through said feeding means back into said storage means, said system constituting a closed circuit for the circulation of said slurry.

2. A closed circuit slurry feeding system comprising storage means for receiving a slurry, a pump receiving slurry from said storage means, a positive displacement feeding means including a pressure chamber receiving the discharge from said pump, a first conduit means for withdrawing the discharge from said pressure chamber during pressure discharge from said feeding means, a second conduit for recirculating material from said pressure chamber back into said storage means while said feeding means is not discharging, and a bypass system selectively receiving the discharge of said pump in advance of said feeding means and arranged to direct the discharge of said pump back into said storage means.

3. A slurry feeding system comprising storage means for receiving a slurry, a pump receiving slurry from said storage means, a bypass means connected to the discharge end of said pump and arranged to circulate slurry back into said storage means, a feed means connected to the discharge end of said pump downstream of said by-pass means, valve means for selectively directing the discharge of said pump into said bypass means or into said feed means, outlet means for discharging slurry from said feed means under pressure, valve means associated with said outlet means for controlling discharge through said outlet means, venting means for withdrawing slurry from said feed means while said feed means is not discharging and for returning slurry to said storage means, and valve means for closing said venting means during the filling of said feed means.

4. A slurry feeding system comprising storage means for receiving a slurry, a constantly operating pump receiving slurry from said storage means, a feed means connected to the discharge end of said pump, said feed means being arranged to have a discharge cycle and a filling cycle, a bypass means connected to the discharge end of said pump upstream of said feed means, valve means selectively operable to direct the discharge from said pump into said feed means or into said bypass means, means for withdrawing slurry from said feed means during its discharge cycle, and means for recirculating slurry from said feed means back to said storage means during said filling cycle of said feed means.

5. A slurry feeding system comprising storage means for receiving a slurry, a constantly operating pump receiving slurry from said storage means, a piston type feed means having a filling cycle and a discharge cycle connected to the discharge end of said pump, a by-pass means upstream of said feed means arranged to direct slurry from said pump to said storage means, valve means for selectively directing the discharge of said pump into said bypass means or into said feed means, outlet means for withdrawing slurry from said feed means during its discharge cycle, and means for recirculating slurry back into said storage means during said filling cycle of said feed means.

6. The method of feeding a slurry having a tendency to settle out particles which comprises continuously pumping said slurry from a storage means into a positive displacement feed means to fill said feed means, continuing the flow through said feed means after filling and directing the overflow from said feed means into said storage means, periodically terminating the flow into said feed means while by-passing flow from said storage means back into said storage means, and discharging slurry from said feed means during such periodic termination.

References Cited in the file of this patent

UNITED STATES PATENTS

| 1,579,434 | Brombaker | Apr. 6, 1926 |
| 2,364,264 | Yeomans | Dec. 5, 1944 |
| 2,646,190 | Hensgen et al. | July 21, 1953 |